April 9, 1946.   J. M. FOWLE ET AL   2,397,933
LINE TRACKER CONTROL
Filed Feb. 19, 1943   5 Sheets-Sheet 1

Fig. 1.

Inventors
JOHN M. FOWLE,
HARRY E. KENNEDY,
By
Greenewald
Attorney

Fig. 9.

April 9, 1946. J. M. FOWLE ET AL 2,397,933
LINE TRACKER CONTROL
Filed Feb. 19, 1943   5 Sheets-Sheet 5

INVENTORS
JOHN M. FOWLE,
HARRY E. KENNEDY,
BY
ATTORNEY

Patented Apr. 9, 1946

2,397,933

UNITED STATES PATENT OFFICE 2,397,933

LINE TRACKER CONTROL

John M. Fowle, Piedmont, and Harry E. Kennedy, Berkeley, Calif., assignors to The Linde Air Products Company, a corporation of Ohio Application February 19, 1943, Serial No. 476,410

35 Claims. (Cl. 250—41.5)

This application is in part a continuation of our copending parent application Serial No. 357,778 filed September 21, 1940, for Method and means for producing contours in material.

This invention relates to line tracker control, and more particularly to method and apparatus of this character in which relative movement of the line or contour and a stream of radiant energy in overlapping relation is effected, and the relative movement is controlled in response to the ratio of the portion of radiant energy passing or escaping interception or other effect thereon by the line, to the portion cut off thereby.

The expedients heretofore proposed for line tracker control employing a stream of radiant energy have depended upon variations in intensity of the stream of radiant energy upon a sensing device. Such sensing device progresses along the line, and as the sensing device departs from the line, a variation in intensity of the stream of radiant energy results. This variation in intensity has been utilized for correcting the alignment of the direction of progression of the sensing device with respect to the direction of the line. However, such corrective operation is necessarily delayed until the cumulative variation in intensity becomes sufficient to start the corrective operation, with the result that inaccuracies have already occurred before the corrective operation is made.

It is therefore the main object of the present invention to improve the accuracy of the line tracker control.

This variation in intensity employed in the prior expedients has been a variation in a continuous impulse, and although the impulse has been interrupted in certain prior expedients, the interruption has been merely to permit the use of an alternating current type of amplifier and not for the purpose of closer control.

By contrast, according to the present invention, a stream of radiant energy is subjected to alternately overlapping and clearing relation with successive small edge zones along a contour, whereby part of the stream is affected by said contour and the remainder of said stream passes or escapes interception or other effect thereon by said contour, thereby causing an impulse for each alternation; and the contour and stream are relatively propelled along the contour in response to a part of each impulse; and the alignment of the direction of relative propulsion to the direction of the contour is corrected in response to another part of each impulse. The alternations are preferably cycles of rapidly recurring frequency in substantially regular succession. Inasmuch as a part of each cycle or alternation is employed for corrective purposes, a greatly increased accuracy of line tracking is achieved.

It is therefore a further object of the present invention to effect the line tracker control in response to timing or duration of portions of impulses of radiant energy in each cycle of a substantially regular succession of impulses of rapidly recurring frequency.

Another object is to effect the overlapping of the line or contour with the stream of radiant energy by recurrent translation thereof relative to successive small edge zones along the contour or outline.

Another object is to employ the phases of a power circuit to effect the desired movements, and to control the direction and extent of movement by thermionic selection.

Another object is the automatic reproduction of a desired contour or shape in material, from a drawing, model, or other representation of its configuration.

A further object of the invention is to provide an apparatus in which the lines of a drawing or the outline of a part are caused to dictate automatically the direction in which work in a machine tool is to be fed, for the purpose of obtaining an accurate reproduction of the shape represented by the drawing or part.

Another object of the invention is to employ radiant energy in connection with a drawing or other contour of a part in such manner as to cause work in a machine tool to be fed automatically along a path duplicating the drawing or contour, enabling a stationary cutter or other tool to reproduce the desired shape accurately in the work.

Still another object of the invention is to automatically produce an accurately mating punch and die from a single drawing or other outline representative of the contour of the parts to be stamped by the punch and die.

The invention has numerous other objects and features of advantage, some of which, together with the foregoing, will be set forth in the following description of apparatus exemplifying the invention and employing its novel method. It is to be understood that the present invention is not limited in any way to the specific method and apparatus described in the present application, as various other embodiments may be adopted within the scope of the appended claims.

Referring to the drawings.

The apparatus shown in the drawings contemplates the obtaining of impulses through the intersection or overlapping of a sensing device and a contour, such as a line of a drawing or the outline of a templet or an article to be reproduced, by recurrently translating an opening in the sensing device relatively to successive small edge zones along the contour, and employing these impulses to effect a feeding of the work in the same direction as the corresponding line of the drawing or the outline. Although the principles of the invention may be adapted for use with other types of energy, waves, or impulses, such as magnetic heat, sound, etc., the invention has been disclosed as employing light impulses because of the relative simplicity of the apparatus and because the pattern may be formed quickly and easily by drafting room or photographic methods, and the light impulses are easily controlled.

The invention is also adapted to various forms of machines for various cutting, welding and other operations, in which either the tool or the work is moved, and the tool comprises a cutter, torch, electrode or other means for operating upon the work. If a milling machine is used which is provided with a cutter rotatable about a fixed axis, the movement of the work table by its feed motors causes a cut to be made in the work as dictated by the drawing or outline. The drawing, if secured to the work table, will be moved by the feed motors in the same direction as the work table, maintaining the fixed sensing device always in the same relation to each new increment or portion of the guiding line or outline, in order that said outline may continue to direct the advance of the work in accordance with the particular direction of the line or outline at each instant. The operation is continuous, with the work table always moving so as to keep the line correctly disposed with respect to the fixed position or location of the sensing device. Accordingly, the cutter cuts a path in the work which is precisely similar to the guiding outline of the drawing or pattern.

It may be pointed out that the drawing or pattern must guide the path or locus of the work outline in such a manner that the cutting surface of the tool will remove material from one side only, of the border of the desired form. In the particular embodiment of the invention being described, the cutting tool is a rotating end mill having a diameter of appreciable magnitude when considered in relation to the size and accuracy of the finished workpiece. Therefore, the work table must trace a path which is not the same as the border of the desired finished product, but rather must trace an outline which is larger or smaller than the pattern outline by a constant normal distance equal to the radius of the cutter. If the path of the work table is larger than a drawing outline by a constant normal distance equal to the radius of the end mill, the resulting product, after the passage of the cutter will be a male duplication of the drawing outline. Conversely, if the work table traces a path or locus smaller than the drawing outline by a constant normal distance equal to the radius of the end mill, the resulting product will be a female duplication. Accordingly, mechanism embodying this invention will automatically guide the work table over either of two paths to produce male or female duplications from a single drawing.

Figure 1:
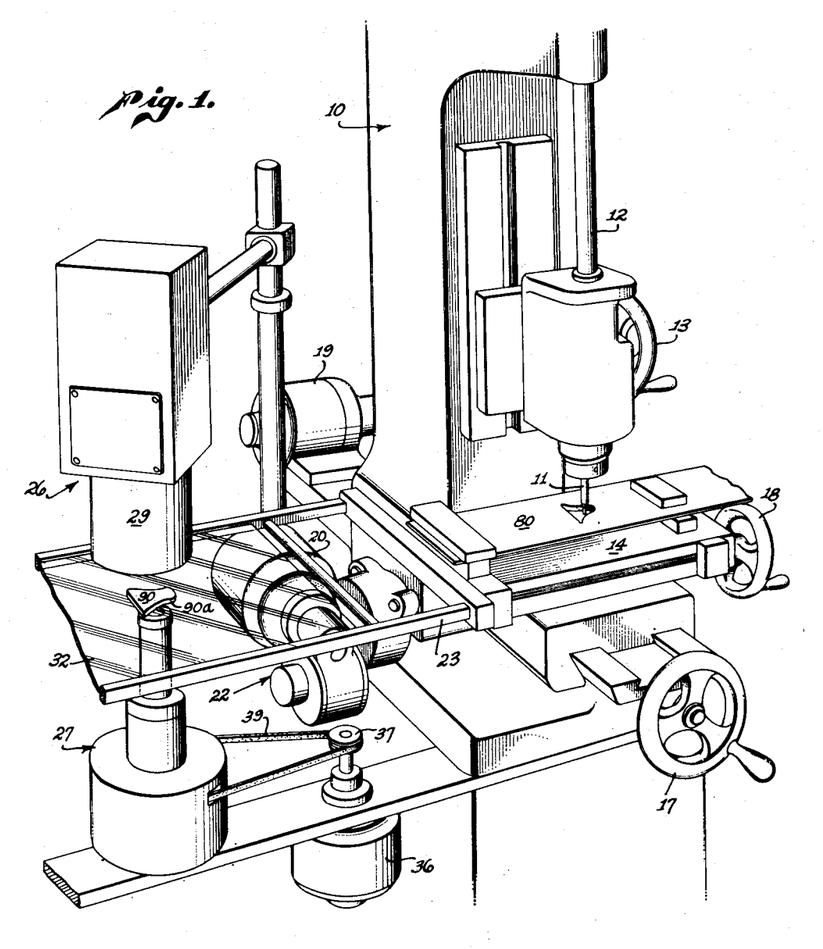
Figure 1 is a perspective view of a machine tool with the work feeding and controlling devices attached thereto.

Referring to the drawings, apparatus embodying this invention may consist of a conventional vertical milling machine 10 having a mill or cutter 11 secured to a motor-driven spindle 12 rotatable about a fixed vertical axis, the cutter being shiftable along this axis, as by means of a hand wheel 13, to determine its vertical position with respect to a work table 14 disposed below it. The table 14 is movable in any and all directions in its own plane by mutually perpendicular feed screws 15, 16 which are suitably connected to the table and rotatable in either direction by the respective hand wheels 17, 18 or by electric motors 19, 20, the driving shafts of which are coupled to the feed screws through suitable mechanical connections 21, 22, as a worm wheel drive or spur gearing.

A bracket 23 is secured to the movable work table 14 for the purpose of carrying the contour to be reproduced. This contour has a contrasting background so that the contour and background differentially affect radiant energy. The differential effect may be relative absorption and reflection of the radiant energy, or the differential effect may be relative transmission and resistance to flow of the radiant energy. Such a contour and contrasting background are provided by a drawing 24 having portions which are relatively resistant to the passage of radiant energy, and other portions which are relatively susceptible to the flow of radiant energy. Thus the drawing may be a blueprint or other negative print on which the line 50 is transparent or translucent and the background is relatively opaque, or the drawing may have lines of India ink or other opaque material, on tracing cloth or paper or other light transmitting material. Also, the contour may be provided by the outline 90a of a finished previously manufactured part or article 90 or a suitable templet.

If the contour and the background are both resistant to the passage of radiant energy, but have contrasting absorption and reflection characteristics, the light source and the sensing device are on the same side of the surface which provides the contour and background, but preferably the differential effect is relative transmission and resistance to flow of the radiant energy.

Figures 3, 6, 7A, 7B, 8:
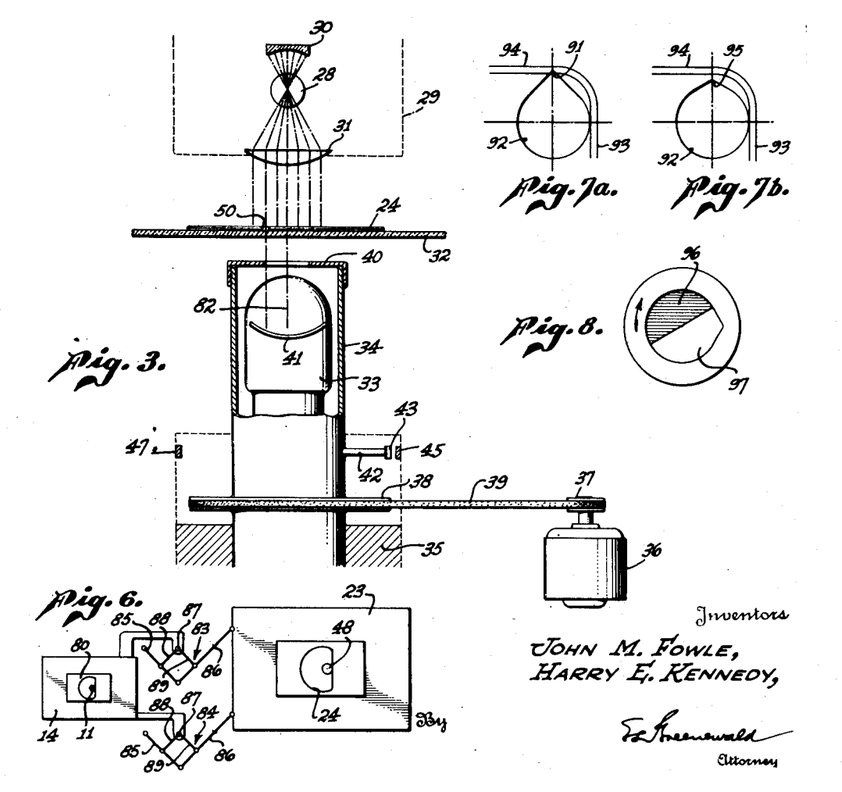
Figure 3 is a diagrammatic side view of the sensing device and parts associated therewith.
Figure 6 is a view showing a modification of the manner of connecting the work table and drawing table shown in Figures 1 and 2.
Figures 7a and 7b are diagrammatic views illustrating the position of two modified forms of shutter at a corner formed by the lines of the drawings.
Figure 8 is a plan view of the shutter, illustrating the use of an optional light shield.

Accordingly, disposed above the bracket 23 is a stationary source of radiant energy 26, and below the bracket and directly opposite the source 26 is a fixed sensing device 27. The source of radiant energy may consist of a light 28 enclosed within a suitable housing 29. Behind the light is a reflector 30 for directing the light through a condensing lens 31, so that parallel rays will shine against the upper surface of the drawing 24 or other pattern 90, preferably placed upon a plate of glass 32 carried by the bracket. If desired, the drawing may be supported directly by the bracket without the aid of the glass plate.

The sensing device 27 includes a photoelectric cell 33 mounted rigidly within a tube 34 rotatable in a supporting bearing by an electric motor 36 having driving connection with the tube through a pulley 37 mounted on the motor shaft, a driving pulley 38 fixed to the tube, and an intervening belt 39. A shutter 40 is secured to the top of the tube 34 to rotate therewith for the purpose of determining the passage of light through the drawing 24 placed on the glass plate 32 to the light sensitive cathode 41 of the photoelectric cell 33. Also secured to the tube so as to rotate with the shutter is an arm 42 having a contact shoe 43 adapted to engage four stationary segments 44, 45, 46, 47 disposed circumferentially around the rotatable tube 34. The shutter 40, as shown in Figures 4, 5a, 5b, 5c, has an opening consisting of a circular portion 48 and a generally V-shaped notch 49 whose sides are tangent to the circle. The center line of this notch 49 lies in the same plane as the center line of the arm 42 and contacting shoe 43.

The rotation of the feed motors 19, 20 and the direction of such rotation is determined by the engagement of the contact shoe 43 with the segments 44, 45, 46, 47, and also by the relation of the shutter opening 48, 49 with respect to the drawing line 50, which governs the passage of light to the photoelectric cell 33. As shown diagrammatically in Figure 4, current is delivered to the feed motors 19, 20 by the respective generators 51, 52, whose armatures 53, 54 are rotated by a common motor 55. These armatures 53, 54 are electrically connected with the motor armatures 56, 57 by the respective leads 58, 59, the feed motor field coils 60, 61 being separately excited. Each generator 51, 52 has two separate fields so connected as to impart opposite generator polarity so that excitation of one field will cause current to be generated in one direction to rotate the feed motor one direction, while excitation of the other field will reverse the direction of the generated current and cause the same feed motor to rotate the other direction.

For convenience of reference, the feed motor 19 will be assumed to rotate its feed screw 15 so as to move the work table 14 in either a north or south direction, while the other feed motor 20 will be considered as capable of rotating its feed screw 16 so as to move the work table 14 in an east or west direction. These specific points of the compass have been referred to solely to simplify a description of the table operation and they are merely intended to represent the fact that one feed motor is capable of moving the work table in directions perpendicular to the directions in which it is movable by the other feed motor. Quite obviously, the machine can occupy other positions in which its feed screws will not lie in the particular compass directions mentioned above.

Figure 4:
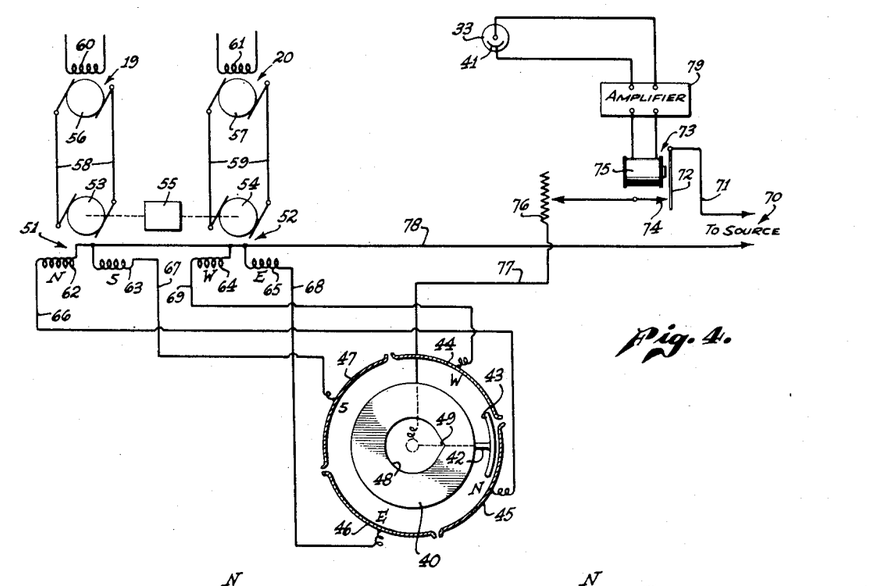
Figure 4 is a diagram representing the electrical control circuit employed in the machine shown in Figure 1.

If the north or N generator field coil 62 is excited, the generator 51 will deliver current to the feed motor 19 so that it advances the work in a north direction. But if the south or S field coil 63 of this generator is excited, the direction of the generated current will be reversed to produce a reversal in the direction of rotation of the feed motor 19, causing it to feed the work table 14 in a south direction. Similarly, excitation of the west or W generator field 64 causes the other feed motor 20 to rotate in a direction to move the work table to the west, while excitation of the east or E generator field 65 reverses the direction of current delivered to the feed motor 20 and causes it to move the work table 14 in an east direction.

The particular generator field or fields which are excited is determined by the engagement of the rotatable contact shoe 43 with the four stationary contact segments 44, 45, 46, 47. The north or N segment 45 is connected to the N field 62 by the lead 66; the opposed south or S segment 47 is connected to the opposite wound S generator field 63 by the lead 67; the east or E segment 46 is connected to the east field 65 by the lead 68; and the opposed west or W segment 44 is connected to the west field 64 by the lead 69. Excitation current for these fields is derived from a suitable D. C. source 70, one line 71 of which is connected to the movable contact 72 of a relay 73, which contact is adapted to engage a fixed contact 74 upon passage of current through an attracting electromagnetic coil 75. The fixed contact 74 is connected with a variable speed control rheostat 76, the rheostat in turn being connected to the rotatable contact arm 42 by means of the lead 77. The contact shoe 43 will permit current to pass to the various generator fields 62, 63, 64, 65 upon engaging the respective stationary segments 45, 47, 44, 46. The return circuit to the D. C. source 70 from the four generator fields is made through a common connection 78.

According to the drawings, each of the four stationary segments 44, 45, 46, 47 extends arcuately for substantially 90 degrees, while the rotating shoe 43 has an arcuate extent of substantially 45 degrees. During its rotation, the shoe will contact any one segment for 180 degrees and any two adjacent segments simultaneously for 45 degrees. As stated, since the four stationary segments 44, 45, 46, 47 are connected to the four generator fields 64, 62, 65, 63, each segment represents one of the four major directions west, north, east and south in which the work table 14 is movable. With the relay contacts 72, 74 closed, if the rotatable shoe 45 engages the N segment 45, the work table will be moved north; if it contacts the E segment 46, the work table will move in the east direction; if it contacts the S segment

47, the motion is south and if contact is made with the W segment 44, the motion of the table is west. Similarly, if the shoe contacts two adjacent segments simultaneously, the corresponding fields on both generators 51, 52 are excited simultaneously, and a composite motion will be imparted to the work table. Thus, engagement of the shoe with the N and E segments 45, 46, will cause the table to be moved northeast; its contact with the E and S segments 46, 47 will cause motion in the southeast direction; its engagement with the S and W segments 47, 44 will produce motion in a southwest direction; and its simultaneous contact with the W and N segments 44, 45, will cause the work table 14 to be moved in the northwest direction. Because of the angular disposition of the four stationary segments and the single rotatable shoe, the switch may be considered as having eight major positions, designated by the compass point abbreviations N, NE, E, SE, S, SW, W and NW, each position covering 45 degrees of rotation.

The excitation of a particular generator field depends not only upon the engagement of the rotating shoe with its particular stationary segment, but also upon the passage of light through the shutter opening 48, 49, onto the photoelectric cell 33. Such passage of light produces an impulse, which is transmitted to an electronic amplifier 79 for the purpose of increasing its value sufficiently to energize the relay coil 75 and cause it to attract the movable contact 72 into engagement with the fixed contact 74. When these relay contacts are closed, the circuit is completed to those generator field coils whose stationary segments are being engaged by the rotatable contact shoe 43. However, if no light is passing to the photoelectric cell 33, the relay contacts are open and no generator fields are excited, causing the feed motors 19, 20 to be stationary.

In the actual operation of the apparatus, the switch arm 42 is rotated with the shutter 40 by the electric motor 36 at a steady speed, so that if the relay contacts 72, 74 are held closed continuously there will be no net motion of the work table 14 in any direction, because the feed motors 19, 20 will merely oscillate equal distances back and forth, all forward motion of the work table being nullified by equal and opposite backward motion. It is apparent also that no motion whatever is caused if the relay contacts 72, 74 are continuously held open, since the generator field currents are entirely interrupted and the feed motors 19, 20 cannot move due to the lack of current delivered from the generators 51, 52.

From the foregoing, no movement of the work table 14 occurs if the relay 73 is held either continuously open or closed. But if the relay can be made to close only while the rotating switch shoe 43 is contacting the N segment, for example, a small motion in a N direction will take place. If this action is repeated with each revolution of the switch shoe 43, a series of small movements in an N direction will blend into one another to produce a substantially steady N feed. The photoelectric cell 33 and amplifier 79 have the ability to operate the relay substantially in exact accordance with the presence or interruption of light falling on the light sensitive element of the cell. Such presence and interruption of light at the proper instant in the rotation of the switch arm 42 can be used to produce motion in any one of the eight major directions, and proper timing of the starting and stopping of the light passage to the photoelectric cell 33 will produce motion in any intermediate direction by a combination of the feeds. In other words, the arrangement shown in Figure 4 is capable of producing movement of the work table 14 in any direction in a single plane.

The drawing 24 preferably is in the nature of a blueprint with relatively heavy transparent or translucent lines 50 representing the outline to be cut in the work 80 fastened to the table 14, the areas bordering the lines on the blueprint being opaque. This drawing 24 is placed between the shutter 40 and the light source 28, as by supporting it on the glass plate 32. The work table 14 and drawing 24 coupled thereto are moved manually by rotating the feed screws 15, 16 through the agency of the hand wheels 17, 18, until a line of the drawing is approximately tangent to the circular portion 48 of the shutter hole (see Fig. 5a). As the shutter rotates, the notch 49 in the shutter hole will cross or overlap the transparent line 50 with each rotation of the shutter, and in so doing will permit light passing through the line to continue on through the shutter 40 and strike the photoelectric cell 33, closing the relay contacts 72, 74 and allowing current to pass through the particular generator field or fields whose associated stationary segment or segments might be engaged by the rotating shoe 43. The work table 14 will be moved by a minute amount, and since the shutter 40 is being rotated continuously by the electric motor 36, the notch 49 will intermittently intersect or overlap the transparent line 50 once during each revolution, producing an intermittent feeding of the work table 14 in the same direction as the line 50 is advancing.

For purposes of illustration, let it be assumed that a line 50 on the drawing 24 lies in a north and south direction, and that it is desired to move this line from south to north and obtain a corresponding feeding of the work 80 in the same direction. As aforementioned, the work table 14 is manipulated manually until the line is tangent to the circular shutter opening 48 (see Figure 5a). With the shutter 40 rotating in the direction of the arrow 81, the notch 49 will begin to move under the line 50. As soon as this occurs, light can pass through the notch opening to energize the photoelectric cell 33, and since at this instant the rotating shoe 43 is engageable with both the W and N segments 44, 45, both the W and N generator fields 64, 62 will be excited, causing the feed motor 19 to move the work table in an N direction, and the other feed motor 20 to move the work table in a W direction. The resultant motion will accordingly be in a northwest or NW direction. So long as the rotatable shoe 43 is engageable with the W segment 44, the work table 14 will move partly in a westerly direction, and since the bracket 23 supporting the drawing 24 is coupled directly to this table, the transparent line 50 being scanned by the shutter 40 will also move in the W direction, or toward the center 82 of the shutter, overlapping its circular hole portion 48 to a certain extent.

While the work table 14 is moving northerly, the transparent line 50 is also being moved in the same direction. As the shutter rotation in the direction of the arrow continues, the shoe 43 will move entirely off the W segment 44 and will contact only the N segment 45 (see Figure 5b). Since the opening 48, 49 in the shutter is still overlapping or intersecting the transparent line, light will pass through the cross-hatched zone to the photoelectric cell 33 causing the relay contacts 72, 74 to remain closed, resulting in the continued excitation of the N generator field 62 and the rotation of the feed motor 19 in the proper direction to continue movement of the work table 14 and the drawing 32 in the N direction. As rotation of the shutter 40 and the shoe 43 continues further, the latter will also contact the E segment 46, and since light can still pass through the shutter to the photoelectric cell, both the N and E generator fields 62, 65, will be excited, and the two feed motors 19, 20 will operate to shift the work table 14 and drawing 24 in a northeast direction.

Figure 5A:
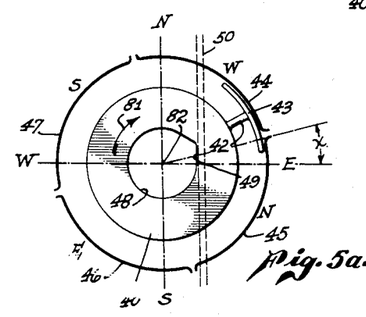
Figures 5a, 5b and 5c are diagrammatic representations of the sensing device, useful in explaining the operation of the invention.
Figure 5B:
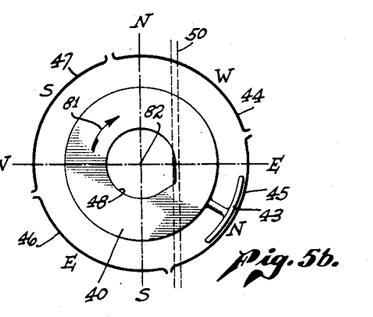
Figure 5C:
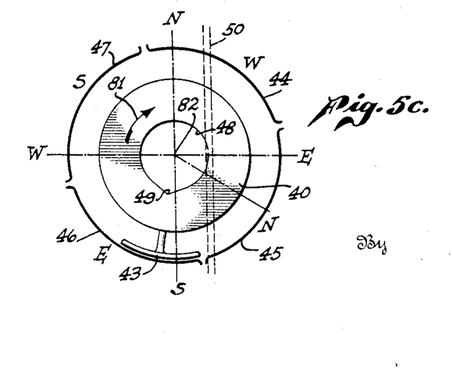

While the shoe was contacting both the N and E segments 45, 46, the drawing and work table moved NE, or diagonally away from the center line 82 of the shutter; and while only in engagement with the N segment 46, (see Figure 5c) the motion of the work table 14 and drawing 24 continues in the E direction away from the center 82 of the shutter. At some instant in the angular motion of the shutter and shoe, the notch 49 will move from overlapping relation with the line 50, but due to the fact that the line was initially moved in a westerly direction toward the center 82 of the shutter from the position shown in Figure 5a, light will continue to pass to the cell 33 through the circular shutter opening 48, allowing a compensating or return movement of the line 50 in a direction away from the center of the shutter to continue while the shoe is contacting the E segment 46. Figure 5c shows the relative separating motion then occurring between the shutter and the line. A very small area of overlap is shown by comparison with the larger area of overlap (shaded) in Figure 5b. Eventually, such eastward movement will shift the line back to its initial tangent position with respect to the circular shutter opening 48, and all feeding motion will stop, due to the cutting off of light to the photoelectric cell 33, and the resulting opening of the relay contacts 72, 74. This action will occur at a point before the rotatable shoe 43 contacts the S segment 47 to prevent a reversal in movement of the table and drawing from the major north direction. The foregoing cycle is repeated with each revolution of the shutter 40 and contact arm 42, the work table 14 being fed in a series of small steps from S to N, moving the drawing 24 along with it in a path parallel to this S—N line.

A similar analysis can be made for any other line which may be chosen, regardless of the angle at which it is disposed. A curved line can be treated exactly as a series of very short straight lines, because the shutter 40 is responding to only very short portions of the line at any single revolution. Regardless of the angle of the line, the drawing is first moved or fed so that the line approaches closer to the center 82 of the shutter when the notch 49 admits light to the photoelectric cell 33. As the shutter continues its rotation, the motion in the major direction takes place, but toward the end of the admission of light to the cell, the line is again moved away from the center of the shutter sufficiently so that the light is eventually cut off by the edge of the circular portion 48 of the screen hole. Accordingly, each cycle is completed after the line has moved away from the center 82 of the hole by the same amount that it has initially approached it, the net result being movement of the line 50 and work table 14 in the direction in which the line extends.

It is to be noted that the stationary switch segments 44, 45, 46, 47 are skewed with respect to the direction of the major feed axis by a certain angle $x$. These segments are advanced by this phasing angle with respect to the feed axis to insure that the shutter and line move toward each other during the initial period of motion. This angle must also compensate for the time lag in the action of the relay 73 and the response of the feed motors 19, 20. It has been found that an advance of the switching segments about 20 degrees will be sufficient for very slow rotation of the shutter 40, but this angle $x$ should be increased with increasing shutter speed. A latitude of about plus or minus 10 degrees is usually permissible.

If there is insufficient angle of skew, the transparent line 50 will not be fed initially toward the shutter center line 82 by the required distance. Therefore, if the next portion of the line bends away from the shutter, the circular opening 48 will not overlap the line during subsequent revolutions, and the shutter and line will fail to maintain their required relation. In an extreme case, the line might thus leave the shutter to such an extent that no light would pass even through the notch 49, causing all motion to cease.

If there is too much angle of skew, the line 50 will be driven too close to the shutter center line 82. Insufficient time during the rest of the shutter revolution will remain for the line to move away from the shutter to its initial position tangent to the shutter hole 48. After the notch 49 has passed the line, the circular hole portion 48 of the shutter will continue to overlap the line by an appreciable amount, the line failing to move far enough away from the center 82 of the screen by the time the next segment, as the S segment in the foregoing specific example, is reached. The light of the source 28 will never be shut off entirely from the photoelectric cell 33, and the relay 73 remains closed at all times. Further progression of the work 80 and drawing 24 in the desired direction will not occur because the feed motors 19, 20 will merely oscillate back and forth with each revolution of the switch. The angle of skew may be considered correct if the light is interrupted by any of the circular portion of the shutter and if the major motion is not reversed even momentarily toward the end of the cycle.

A further analysis will reveal that control of direction resides in the angular or time duration of the relay closure. The correct angular setting of the contact segments, 44, 45, 46, and 47, as designated by angle $x$, Figure 5a, will insure the line 50 being driven closer to the center 82 during the initial portion of the cycle. If the relay contacts were thereupon opened early in the cycle and all feeds stopped, the line and the center would remain in this closer proximity. However, if the relay contacts were maintained closed sufficiently long, the line and the center would separate beyond their initial relation and would remain so separated after the contacts were opened. Thus a succession of short cycles drives the line closer to the center and a succession of long cycles drives the line farther from the center. If the line drifts away from the center ever so slightly, it will fail to overlap the circular portion of the shutter, but not the notch 50. The duration of overlap of the notch is short so that the cycle is shortened and the line is driven back toward the center. If the line drifts toward the center ever so slightly, it overlaps the circular portion of the shutter for a longer time, lengthening the cycle and driving the line away from the center.

It is to be understood that the cycles repeat themselves with sufficient rapidity, and the feed accomplished during one cycle is sufficiently small, to produce a substantially steady and unwavering feed of the work table with relation to the cutter. Therefore, the minute changes in distance between the line and the center occurring within each cycle are of no consequence in relation to the size of the figure. Consequently if the line is made tangent to the circular portion of the shutter at the conclusion of each cycle, it may be considered as being exactly tangent at all other times.

In practice, it is found that the shutter 40 may operate over a wide range of speeds without altering the accuracy or smoothness of the finished cut. A speed of about 300 R. P. M. is usually chosen, although this may be reduced to 100 R. P. M. or increased to 500 R. P. M. at will. However, if the speed is altered, it becomes necessary to shift the stationary segments 44, 45, 46, 47 for the purpose of compensating for the time lag of the relay 73 and the time lag in the feed motor response to the application of exciting current to the generator fields. The limitation in the direction of increased R. P. M. is reached with the failure of the relay and other parts of the circuit to respond accurately to minute variations in the duration of illumination received by the photoelectric cell. The limitation in the direction of reduced R. P. M. is reached with the roughening of the finished cut caused by the more pronounced pulsating character of the feed.

As the drawing 24 progresses in relation to the shutter 40, so does the work 80 progress in relation to the cutter 11. In order to obtain an exact reproduction of the drawing, the diameter of the cutter should be made equal to the diameter of the circular portion 48 of the shutter hole. Since the center 82 of the shutter maintains a definite radial distance from the line of the drawing, which is the radius of the cutter, the drawing designates the path of the edge of the cutter, and not the path of its center, because the center of the cutter, of necessity, maintains a fixed radial distance from the finished surface of the cut. The finished part will be either a male or female reproduction of the drawing outline, depending upon which side of the line the shutter has been started. The traverse around the drawing outline will be in opposite directions to produce male or female parts. Therefore, one drawing can suffice to direct the production of both male and female reproductions, even though the path traced by the center of the cutter in the work is different in the two cases.

Figure 2:
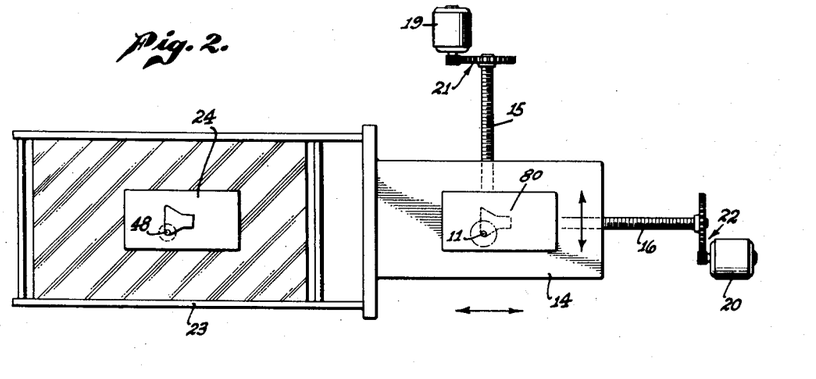
Figure 2 is a diagrammatic view, illustrating the work table and drawing support in connection with the feed screws and motors for rotating them in different directions.

In Figures 1 and 2, the drawing support bracket 23 is shown as being secured directly to the work table 14, the reproduction being on a one to one scale. If greater accuracy is required, or in the event that the size of the finished part is so small as to be shown only with difficulty in a one to one scale drawing, a motion multiplier may be interposed between the drawing bracket 23 and the work table 14, as shown in Figure 6. In that specific illustration, two identical pantograph multipliers 83, 84 are used, each of which has one end of a link 35 pivoted to a fixed support, the end of another link 86 to the supporting bracket 23 for the drawing, and the pivot connection 87 of two intermediate parallelogram links 88, 89 pinned to the work table 14. As the work table 14 moves, it produced twice the motion of the drawing support 23, requiring the figure on the drawing to be made twice as large as the finished part is intended to be. In order that the shutter 40 and cutter 11 hold geometrically similar relations to the drawing 24 and work 80, the circular opening 48 of the shutter is made twice the diameter of the cutter. Other multiplying devices than the one specifically shown may be employed.

In producing an accurately mating punch and die, their respective outlines must be made to differ slightly in order to obtain the necessary clearance. The extent of clearance can be determined on either the punch or die, or on both, during the process of cutting the outline with the apparatus shown in the drawings. With a given diameter of shutter opening 48, a male part can be made smaller or a female part larger by increasing the diameter of the cutter 11. Conversely, the same effect is obtainable by reducing the diameter of the shutter hole 48. However, it is inconvenient to alter this diameter within small limits by changing the shutter plate 40, but several other methods are available, as by providing an adjustable eccentric mounting of the shutter on the rotatable tube 34, so that the active portion of the shutter hole is made to revolve about a larger or smaller radius than if the hole were disposed coaxially of the tube. The circular portion 48 of the shutter opening will not be a true radius about the center of rotation, but actual operations of the machine have proven that this is of no consequence if only small variations from the coaxial positions are made.

Another method of cutting the proper clearance between the punch and die is to make use of light parallax, or the diffusion of the light emanating from the light source 28. Although the light rays leave the condensing lens 31 in substantially parallel paths, there is some inevitable diffusion. Accordingly, the shadow defined by the lines of the drawing is not critically sharp, becoming more blurred at increasing distances of the shutter from the drawing 24. If the shutter 40 is moved downwardly away from the drawing by a small distance its opening will intercept this blurred outline, and in order for the tangential relation between the image of the line 50 and the circular portion 48 of the shutter to be maintained, the line must be displaced from the shutter as measured in a horizontal plane. This horizontal displacement between the shutter hole and drawing line produces the same effect as if the hole 48 had been made physically larger in diameter. Thus, the cut made on the work 80 may be controlled within small limits by adjusting the vertical distance between the drawing 24 and the shutter 40.

A further method of adjusting the clearance is by altering the "threshold of illumination" at which the photo-electric cell controls the electronic amplifier 79. If the grid bias control is altered in a certain direction, more light must strike the photocell to maintain the grid at its correct operating bias (or voltage), and this additional illumination can only be accomplished by increasing the area of overlap between the shutter hole 48 and drawing line 50. Such change in bias produces a final effect similar to a physical reduction in the diameter of the shutter hole 48, causing an increase in the size of a female object or a reduction in the size of a male object, without seriously affecting the accuracy of the cut.

The present invention makes it possible to produce a female figure from a male sample or templet, and conversely, a male figure from a female sample or templet. Let it be assumed that it is desired to cut a punch and die for stamping some part. A templet 90 of the desired part is cut out of paper and laid on the glass plate 32, replacing the drawing 24 in the machine described above. The table 14 is adjusted manually so that the templet 90 fully covers all portions of the shutter hole 48. The table then is gradually moved in the proper direction until a portion of the outline 90a of the templet is tangent to the circular portion 48 of the shutter opening. As the shutter 40 rotates, its notched opening 49 will extend beyond the templet outline 90a and allow light to pass to the photoelectric cell 33, which will start the progression of the work table 14 and connected templet 90 in the same manner as was described above in connection with the drawing 24. The center 82 of the shutter will at all times be located within the opaque body of the templet, the cutter edge corresponding exactly to the edge of the circular shutter hole in producing the finished part, which will be a reversal of the templet to constitute the die.

The die thus formed may now be placed on the glass 32 after the removal of the templet 90, and the table 14 moved until the opaque portion of the die covers the shutter circle 48 completely. The table is then moved manually until a portion of the die outline is tangent to the circular opening 48 of the shutter 40, which will permit the notch 49 to intercept and pass light to the photoelectric cell 38 as the shutter rotates. The work table 14 will begin to move as described above in connection with the drawing 24, and a cut will be made in another piece of metal fastened to the work table. The new part produced will be a reversal of the die, which was scanned by the rotating screen, and will be similar to the original templet. This part becomes the punch and will be found to match the die within very close limits. The clearance between the punch and die can be determined by the operator who will make the necessary adjustments by following any of the above-described methods.

There are many advantages associated with working from a templet to a female die, and then to the male punch. A full range of light intensity is transmitted to the photo-electric cell 33 through the highly transparent glass 32 supporting the pattern 90, as defined by the perfectly opaque background of the pattern. Such contrast in illumination is difficult of attainment by transmission of light through a drawing 24, and no errors are introduced due to variations in the width of a drawing line 50.

Figures 7a and 7b illustrate modifications for use when the contour being followed has sharp concave corners.

When following figures having sharp concave corners, the notch 49 on the shutter should preferably have the smallest radial projection consistent with its function of admitting light for restarting the cycle. A comparison between a long and a short projection is illustrated in Figures 7a and 7b. In Figure 7a, the notch 91 projects beyond the circular arc 92 of the shutter by a substantial distance. The north and south line 93 is assumed to be moving southward, and with it the east and west line 94. At the instant shown, the shutter projection 91 is just intersecting the east and west line 94. Thus the sensing element is acted upon by two lines simultaneously. The resultant of the two actions is to drive the work table across the corner designated by the drawing so that the corresponding corner in the work piece is not cut to its full depth. The advantage of a short radial projection 95, Figure 7b, resides in the lessening of this effect. The short projection illustrated is comparative in magnitude to the distance advanced by the work table in one complete cycle. It is apparent that the east and west line 94 can approach much closer to the circular portion 92 of the shutter before its presence will be detected by the sensing element. With such a configuration the bridging of corners is barely measurable and of no consequence.

Figure 8 shows a light shield which allows operation at higher shutter speeds. With higher shutter speeds or in case of excessive backlash existing in the work table feed screws 15 and 16, one full cycle of operation occasionally fails to complete itself within one revolution of the shutter. During the initial part of the cycle the line 50 will approach closer to the center of the shutter 82 but the two may fail to separate prior to a reversal of the major motion. To avoid instant stoppage of the feed occasioned by a failure of the relay contacts 73 to open, a light shield may be placed over a portion of the shutter hole. This is shown in Figure 8 where 96 is the opaque light shield and 97 is the transparent opening remaining. This light shield positively interrupts the light and concludes the cycle so the next cycle may proceed in a normal fashion. After one or two more cycles, the shutter and the line will have resumed their normal tangential relation and the feed will continue.

Another purpose of the light shield is to permit reverse rotation of the shutter. For either rotation the same basic angular displacement of the contact arcs 44, 45, 46, 47, is maintained. But whereas with right-hand rotation as described in connection with Figure 5, angle $x$ must be increased to compensate for time lag, with left-hand rotation, angle $x$ must be reduced by an equivalent amount.

A modification of our line tracker control system is shown in Figures 9 to 15 inclusive, which employs thermionic tubes respectively energized by the four phases of an alternating current power circuit, instead of the four contact segments and the rotary shoe. In this control system or mechanism the shutter rotating motor 196 is a synchronous motor and the shutter is run at synchronous speed, for example, 3600 R. P. M. preferably direct drive, or through a one to one chain or gear train, or other positive connection. The construction and operation of this control system is identical with that of the previously described form, except as hereinafter set forth, and hence description common to both control systems will not be repeated.

Figure 9:
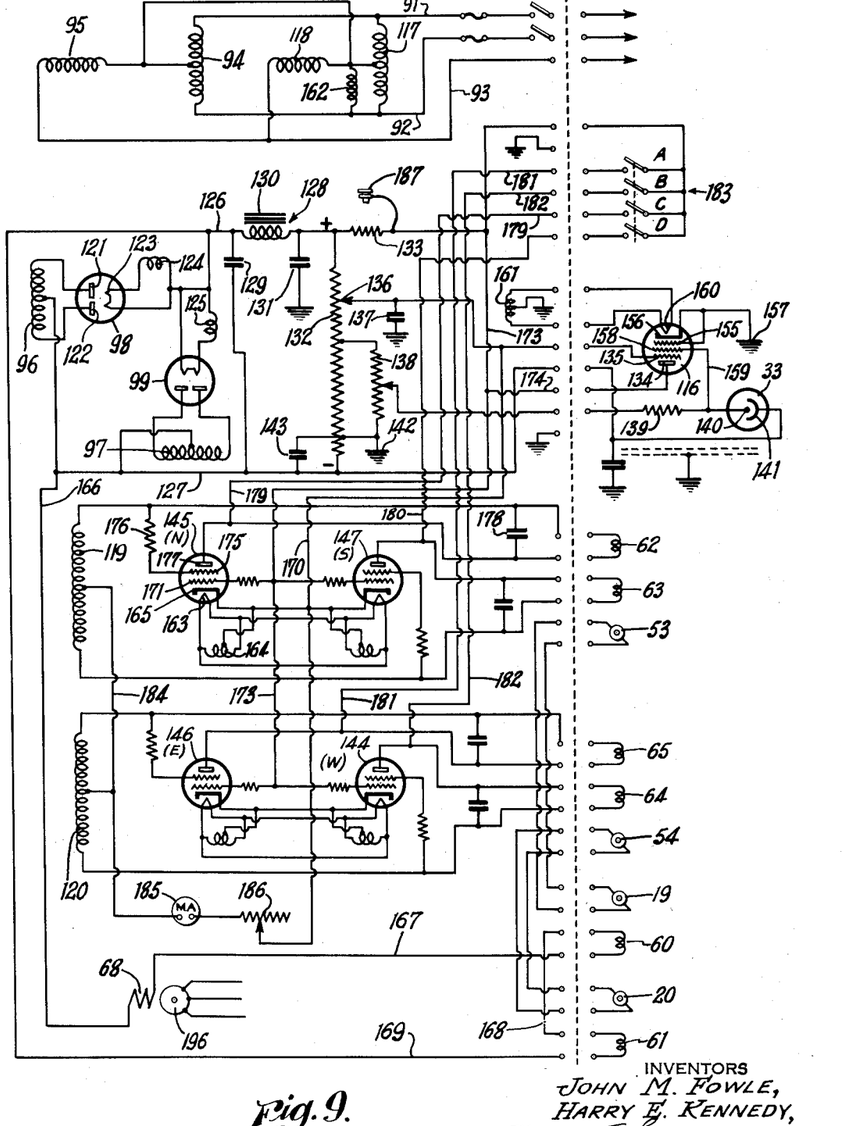
Figure 9 is a diagram of the circuit employed in a modification of the invention employing thermionic tubes in successive phase relationship.

The particular generator field or fields which are excited is determined by its or their phase relationship to the four phases of a power circuit distributed to the four thermionic tubes 144, 145, 146, 147. The north or N tube 145 is connected to the N field 62; the opposed south or S tube 147 is connected to the oppositely wound S generator field 63; the east or E tube 146 is connected to the east generator field 65; and the opposed west or W tube 144 is connected to the west generator field 64.

Referring to Figure 9, power is supplied from a suitable source through three phase alternating current mains 91, 92, 93. By means of a Scott connection comprising primary coils 94 and 95 and their secondary coils 96 and 97, two phases are taken off through full wave rectifiers 98 and 99 as a power circuit, producing unidirectional current for energizing the photoelectric cell 33 and amplifying its output through a suitable amplifier, such as the triple grid amplifier 116. This power circuit also energizes the field 68 of the synchronous motor 36, and fields 60 and 61 of the feed motors 19 and 20.

By means of a second Scott connection comprising primary coils 117 and 118, and their secondary coils 119 and 120, an electrically rotating timing circuit is produced, the four phases being distributed to the thermionic tubes 144, 145, 146, 147.

In the power circuit, the terminals of the secondary coils 96 and 97 are connected to the plates 121 and 122 of the respective rectifiers 98 and 99. Their filaments 123 are heated by coils 124 and 125, the coil 124 for the filament of rectifier 98 being energized by the primary coil 95 while the coil 125 for the filament of rectifier 99 is energized by the primary coil 94. The filaments of the two rectifiers are connected together to a common conductor 126, and the mid-points of the secondary coils 96 and 97 are connected to another common conductor 127.

For energizing the fields of the synchronous motor 36 and the feed motors 19 and 20, a conductor 166 connects the conductor 127 to the field 68, in series with the fields 60 and 61 by means of conductors 167 and 168 and a conductor 169 connects the field 61 to the conductor 126.

For smoothing out ripples in this rectified circuit, a filter 128 is provided, comprising a shunt condenser 129, a choke 130, and a grounded condenser 131 and 143. A voltage divider or potentiometer 132 is connected between the conductors 126 and 127, the conductor 126 being connected through a resistance 133 to the plate 134 of the amplifier 116, which may be of any suitable construction, such as for example the 6J7 type.

The screen grid 135 of the amplifier 116 is connected to an intermediate point 136 of the voltage divider, a grounded condenser 137 being provided for this connection. The anode 140 of the photoelectric cell 33 is connected directly to the control grid 158 of the amplifier 116 by the connector 159. The threshold of illumination at which the photoelectric cell would control the amplifier is established by the setting of the potentiometer 138, the adjustable point of which connects to the control grid 158 through the grid resistor 139. The suppressor grid 155 and the cathode 156 are grounded at 157. The filament 160 is energized by a secondary coil 161 having its mid-point grounded as shown, its primary coil 162 being connected between the main 92 and the mid-point of primary coil 94.

The electrically rotating timing circuit includes the four thermionic tubes 144, 145, 146, 147, such for example as the 6V6 or 6J7 type. Each tube has a filament 163 heated by a secondary coil 164, those for tubes 145 and 147 being coupled with the primary coil 119, and those for tubes 146 and 144 being coupled with the primary coil 120. The mid-points of the secondary coils 119 and 120 are joined and connected by a conductor 184 through a milliammeter 185 and a variable resistance 186 to the cathodes 165 of the four tubes, so that the variable resistance 186 serves as a speed control device. The cathodes 165 are all connected by a conductor 170 to the voltage divider. The grids 171 have resistances 172 in series therewith.

The four control grids 171 are tied together and connected by conductors 173 and 174 to the plate 134 of the amplifier 116. The screen grids 175 are connected to the alternating current voltage source through resistors 176, to limit their current to a safe value. The plates 177 of each of the tubes are respectively connected to the generator fields 62, 63, 64, 65. Condensers 178 are shunted across the output of the respective tubes and their generator fields. The plates 177 of each of the tubes are respectively connected by conductors 179, 180, 181, and 182 through manually operated switches 183 A, B, C, and D to the common grid terminal 173. The symbol 187 is diagrammatic, to indicate that an oscillograph may be connected at this point, for testing and setting up the apparatus, particularly the sensing device.

Describing more specifically some features of the circuit, attention is directed to the four phase rectifier. The ripple is very small, but what remains is in phase with the four phase power tube supply and hence is equally effective on all tubes and therefore of no consequence. The various filter condensers are dispersed to their best adavntage to overcome stray impulses and reduce "creep" to a minimum. This "creep" is the tendency of the drive motors to move the work table in response to stray impulses. The chassis should be grounded but any desired connection of the three phase supply is satisfactory.

The photocell constitutes the negative portion of the grid circuit of the amplifier tube and the resistor 139 constitutes the positive portion. This arrangement permits coupling the first amplifier directly to the grids of the four power tubes without an inverter circuit. The cathodes are now in a low impedance circuit and are not subject to stray impulses.

Each of the 6V6 grids has a one megohm resistor in series to balance the output of the 6J7 more equally. The 6V6 tubes may not be exactly similar and one grid may draw more current than another when positive, thus possibly holding the grid voltage down and seriously unbalancing the outputs, if such resistor is not employed.

The screen grids have 10,000 ohm resistors to limit their current to a safe value. Because the screen grids are connected to the A. C. voltage source, the plate current is proportional to the applied voltage as in the case of a triode, a condition essential to the correct functioning of this type of control.

The manual control push buttons 183 A, B, C, and D connect the common grid lead 173 to any one of the 6V6 plates so that they all receive a positive impulse at the proper phase time to produce the desired direction. The automatic or photocell feed is inoperative while one of the buttons is held down because the direct connection predominates over the photocell impulse.

The two D. C. motor fields and the synchronous motor field are connected in series ahead of the filter choke so that strays which may be picked up from the motors or generators are not reflected into the control circuit. In order to increase the current supplied to the feed motors, a plurality of tubes may be arranged in parallel for each of the four phases.

Each of the four thermionic tubes 144, 145, 146, 147 functions for only 180 degrees, or while its plate is at a positive potential. Considering the north tube 144 as operative from zero to 180 degrees, then the south tube 147 is effective from 180 degrees to 360 degrees. But the east tube 146 is operative from 90 degrees to 270 degrees, and the west tube 144 is effective from 270 degrees to 90 degrees. For each cycle, any one tube will be energized for 180 degrees, and any two adjacent tubes simultaneously for 90 degrees, this 90 degrees being the overlap of their respective phases. These tubes perform the additional function of rectifying the alternating current to pulsating direct current for energizing the direct current generator fields.

When a light impulse strikes the photocell, all four power tube grids 171 swing toward the positive, and all four tubes are ready to pass current to their respective fields. But only those tubes the plates of which are positive at that particular instant are operative. If the light impulse occurs while the plate of N tube 145 is positive, the work table will receive an impulse in the north direction; and positive condition of the respective plates of other tubes will cause an impulse to the work table on the other corresponding directions. Similarly, if the plates of two adjacent tubes are positive simultaneously, due to overlapping phases, the corresponding fields of both generators 51, 52 are excited simultaneously, and a resultant motion will be imparted to the work table. Thus, if the plates of the N and E tubes 145, 146 are both equally positive, the table will be moved northeast; and corresponding resultant directions of motion will be caused by the plates of other adjacent tubes being positive simultaneously. Because of the phase relationship of the four tubes, the photoelectric control may be considered as having eight major directions designated by the compass point abbreviations N, NE, E, SE, S, SW, W and NW, each direction covering 45 degrees of rotation, and an infinite number of intermediate directions.

The excitation of a particular generator field depends not only upon the phase relationship of its particular tube for rendering the potential of its plate positive, but also upon the passage of light through the shutter opening 48, 49 onto the photoelectric cell 33. Such passage of light controls an impulse, which is transmitted to the electronic amplifier 116 for the purpose of amplifying this impulse sufficiently to render more positive the control grids 171 of the respective tubes 144, 145, 146, 147. When these grids are more positive, the circuit is completed to those generator field coils which have plates rendered positive by their phase relationship. However, if no light is passing to the photoelectric cell 33, the grids 171 are not rendered more positive and no generator fields are excited, causing the feed motors 19 and 20 to be stationary.

The shutter turns at synchronous speed, 3600 R. P. M., by a direct connection to the synchronous motor 196, so that one revolution corresponds to 360 electrical degrees. A light impulse repeating itself at one particular angular position of the shutter, once each revolution, is impressed on a particular field or fields once each cycle. A steady motion results, the direction of which is determined by the angular position of the shutter as it passes the light impulse.

In the actual operation of the apparatus, the shutter 40 being rotated by the synchronous motor at synchronous speed, if the grids 171 are maintained positive continuously there will be no net motion of the work table 14 in any direction, because the feed motors 19, 20 will merely oscillate equal distances back and forth, all forward motion of the work table being nullified by equal and opposite backward motion. It is apparent also that no motion whatever is caused if the control grids 171 are continuously rendered less positive, since the generator field currents are entirely interrupted and the feed motors 19, 20 cannot move due to lack of current delivered from the generators 61, 62.

From the foregoing, no progress in the work table 14 occurs if the control grids 171 are continuously rendered more positive or continuously rendered less positive. But if the grids can be rendered more positive only while the N tube 147 plate for example is positive, a small motion in the North direction will take place. If this action is repeated for each cycle, a series of small movements in a North direction will blend into one another to produce a substantially steady N feed. The photoelectric cell 33 and the amplifier 116 have the ability to render more positive the grids 171 substantially in exact accordance with the presence or interruption of light falling on the light sensitive element of the cell. Such presence and interruption of light at the proper instant in the cycle of phases of the tubes 144, 145, 146, 147 can be used to produce motion in any one of the four major directions, and proper timing of the starting and stopping of the light passage to the photoelectric cell 33 will produce motion in any intermediate direction by a combination of feeds. In other words, the arrangement shown in Fig. 9 is capable of producing movement of the work table 14 in any direction in a single plane.

At any instant, the speed of travel of the table is the vectorial sum of the two major motions then in use. The speed along either major portion is closely proportioned to the average voltage applied to its tube during the light impulse. The voltage varies sinusoidally in all four phases. Hence, for a constant duration of light impulse the speed in any direction is always the vectorial sum of two sine functions and is essentially constant.

Figure 10:
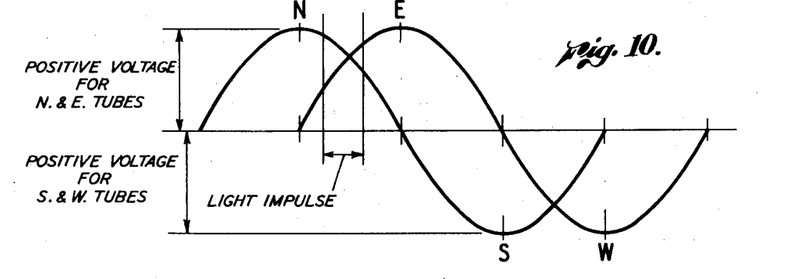
Figure 10 is a diagram showing the sine waves representing the phases of the alternating current control.
Figure 11:
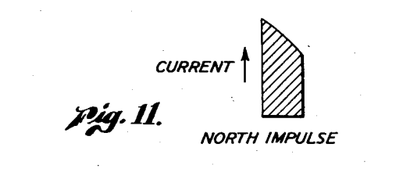
Figure 11 is a view of a portion removed from Figure 10, showing the impulse along one coordinate.
Figures 12, 15:
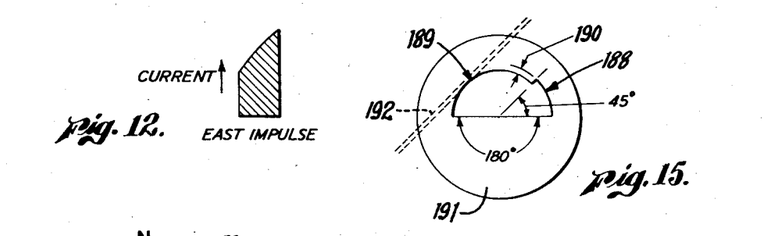
Figure 12 is a view of a similar portion showing the simultaneous impulse along another coordinate.
Figure 15 is an enlarged view of the preferred form of shutter.
Figure 13:
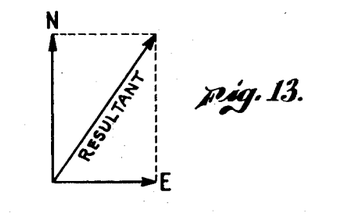
Figure 13 is a view representing the vector sum of the simultaneous impulses of Figures 11 and 12.

Figures 10, 11, 12, and 13 show diagrammatically how a light impulse produces two major motions and one resultant motion. In the example shown, the north and east tubes are positive while the light impulse is acting. The sine waves shown in Figure 10 represent voltage. But within the duration of the light impulse the tube grids are positive, so that current flows in the north and east fields approximately in proportion to the transformer voltage, the field coil and its shunt condenser being considered as a resistance load. The small sections of sine waves which comprise the north and east impulses represent the field excitation current. The areas under the curves as separately shown in Figures 11 and 12 represent average excitation and are proportional to average velocity for repetitive impulses. These velocities are drawn vectorially and the resultant velocity and direction shown in Figure 13.

Obviously, if the light impulse changed its phase time there would be a corresponding change in resultant direction. As stated above, the resultant velocity could not change appreciably. In the example shown, if the light impulse were slightly later, the north average voltage would be lower and the east average voltage would be higher. The average field excitations would vary similarly, lowering the north velocity and raising the east velocity. A still later light impulse would fall beyond the positive north voltage wave altogether but within the south positive voltage wave. The new resultant would then comprise an east and south vector.

The shutter follows the line, always at a tangent, in the same manner as described in the previous control system. A shift or skew is introduced between the stator of the synchronous shutter drive and the active portion of the shutter circle. Thus, the shutter normally tends to drive into the line. It is driven back out by a prolongation of the light impulse when the second, or smaller, radius of the shutter comes into play. The directive drive from the second radius is away from the line. When functioning properly, the short impulse into the line and the long impulse away from the line come to equilibrium to keep the center of the shutter always at a fixed normal distance from the line.

The light shield 96 must always be used with this method of control because the rapid sequence of events does not permit the table to follow and shut off the light once during each cycle. A different type of shutter is to be preferred as drawn in Fig. 15. The two active boundaries of the shutter opening are the driving arc 188 and the correcting arc 189. The two arcs are concentric and their radii are kept as nearly alike as the sensitivity of the photocell circuit, in comparison with the light intensity, will permit. Good practice is to make difference in radii 190 between .005 and .015 inch. It is kept small to avoid bridging corners as explained in connection with Figures 7a and 7b.

The greatest speed of travel will be obtained when the light impulse is 180 degrees in duration. The table stands still when the impulse is either infinitely short or when it is 360 degrees long. Obviously, when choosing the angular spread of a shutter it is desirable to obtain the highest possible speed from a given set of equipment. But furthermore, in the interest of accuracy, a large and distinct change of direction is desirable when the light impulse shifts from the outer driving radius 188 to the inner correcting radius 189 of the shutter. Accordingly, the entire spread of the shutter is preferably 180 degrees, comprising the driving plus the correcting arcs. The mean effective arc during actual operation will be something between the driving and correcting arcs. If the driving arc is long, the mean effective arc will be long, the light impulse will be long, and the speed will be high. But the shift in direction, or the correcting power, will be small. On the other hand, a very short driving arc will give a strong correcting power at the sacrifice of some speed.

These two demands are compromised by making the nominal driving radius 45 degrees in arc. However, it is to be understood that a greater or a less value is within the scope of our invention.

Referring to Figure 15, as the shutter 191 rotates, the driving arc 188 overlaps the transparent line or contour edge 192 with each rotation, and permits light to strike the photoelectric cell 33, imposing a positive potential upon the grids 171 and allowing current to pass through the particular generator field or fields which have the plate or plates of their tube or tubes also at positive potential due to their phase relationship. The work table 14 will be moved by a minute amount, and since the shutter 191 is being rotated in synchronism with the phase relationship of the tubes by the synchronous motor 196, the driving arc 188 will intermittently intersect or overlap the transparent line 192 once during each revolution, producing an intermittent feeding of the work table 14 in the same direction as the line 192 is proceeding.

Figure 14A:
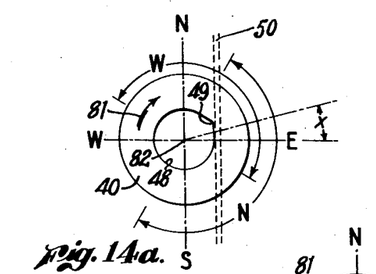
Figures 14a, 14b, and 14c are diagrammatic representations of the sensing device and the phase relationship of the respective thermionic tubes, analogous to Figures 5a, 5b, and 5c.
Figure 14B:
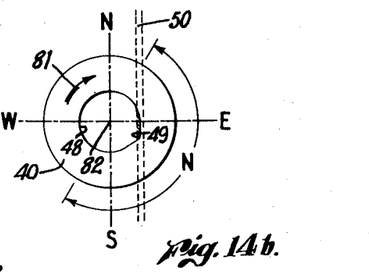
Figure 14C:
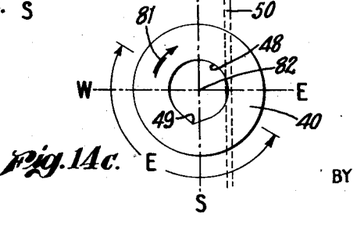

Referring to Figures 14a, 14b, and 14c, the operation of the shutter overlapping the line, and the corresponding motions of the work table, are identical with the system previously described, and will not be described again in detail.

It should be noted that the phase relationship of the tubes 144, 145, 146, 147 are skewed with respect to the direction of the major feed axis by a certain angle $x$. These phases are advanced by this angle with respect to the feed axis to insure that the shutter and line move toward each other during the initial period of motion. It has been found that an advance of less than 20 degrees will be sufficient. A latitude of about plus or minus 10 degrees is usually found permissible. The effects of insufficient and excessive angles of skew are the same as described for the preceding system.

The control of direction resides in the angle or time duration of the positive potential upon the grids 171. The correct angular setting of the phase relationship of the tubes 144, 145, 146, 147 will insure the line 192 being driven closer to the center, during the initial portions of the cycle. If the positive potential of the grids 171 were thereupon discontinued early in the cycle and all feeds stopped, the line and the center would remain in this closer proximity. However, if the positive potential of the grids 171 were maintained sufficiently long, the line and center would separate beyond their initial relation and would remain so separated after the positive potential of the grids was discontinued. It is to be understood that the movement of the table during one cycle is exceedingly small and is less than could be measured by ordinary methods. The effect of the short and long cycles is the same as described for the preceding control system.

The maximum and minimum speeds are governed by practical limitations on the frequency of power circuits, say between 20 and 250 cycles.

In producing an accurately mating punch and die, with a given diameter of shutter opening 48, a male part can be made smaller or a female part larger by controlling the grid bias of the electronic amplifier 116 by potentiometer 138. If its grid bias is increased, more light will be required to render more positive the grids of the tubes 144, 145, 146, 147, and thus additional illumination can only be accomplished by increasing the area of overlap between the shutter hole 48 and the drawing line 50. Such increase in grid bias causes an increase in the size of a female object or a reduction in the size of a male object.

From the foregoing description it will be readily apparent that the novel control system or mechanism provides a trial and correction cycle, which is repeated at frequent intervals in substantially regular succession. In each cycle there is a motion into line and a motion out of line. Both of these motions have translational components along the line. A balance is obtained between the in and out motions which results in a substantially steady progression along the line.

The angle of skew is such as to cause an impulse derived from cooperation between the driving arc and the contour to drive the shutter toward the line. This angle of skew will cause the correcting arc of the shutter cooperating with the contour to drive the shutter away from the line.

The depth of cut or control of clearance between a punch and a die is accomplished by light parallax or adjusting the grid potential or by other expedients.

The sensing of the distance away from the line is accomplished through that proportion of one rotation during which the sensing element is responsive to passage of light past the templet. If the shutter is too close to the line, the sensing element picks up a proportionately long impulse which includes a directive component that predominates and causes the sensing element to move away from the line. Conversely, if the sensing element finds itself too far from the line, the above directive component no longer exists, thereby allowing the inward drive to predominate.

The average phase angle of the impulse determines the direction of motion. This is a function of the circuit only. The average phase angle is determined by two things, the instantaneous direction of the line, and the proximity of the shutter to the line.

If the shutter is too far from the line the impulse is of a short duration determined by the driving arc. The average phase angle (determined by the skew angle) is then into the line. If the shutter is too close to the line, the impulse if of a long duration determined by the driving arc plus the correcting arc. The average phase angle is away from the line. These two cases are functions of the configuration of the shutter only. The relation between the line and the shutter determines the average phase angle, through peculiar shutter configuration, and only incidentally alters duration.

We claim:

1. Method of line tracker control, which comprises relatively moving a contour and a stream of radiant energy along said contour; subjecting said stream and contour to alternately increasing and decreasing overlapping relation in successive cycles of uniform frequency during said relative movement by relative rotation of said stream and contour; and correcting the alignment of the direction of said relative movement with respect to the direction of said contour during each cycle.

2. Method of line tracker control, which comprises subjecting a contour and a stream of radiant energy to alternately increasing and decreasing overlapping relation in successive cycles of uniform frequency by continuous relative rotation of said stream and said contour; successively completing power circuits for relatively propelling said stream and contour in successive angular directions; and energizing said power circuits in response to the proportion of radiant energy escaping said contour to the portion affected thereby during each cycle, whereby said circuits cause a relative movement of said stream and contour toward each other, and a relative movement away from each other during each cycle.

3. Method of line tracker control, which comprises subjecting a stream of radiant energy to alternately overlapping and clearing relation with successive small edge zones along a contour in successive cycles of high frequency, thereby causing an impulse for each cycle; relatively propelling said contour and stream along said contour in response to a part of each impulse; and controlling the direction of said relative propulsion in response to the timing of said impulse within its cycle.

4. Method of line tracker control, which comprises subjecting a stream of radiant energy to alternately overlapping and clearing relation with successive small edge zones along a contour in successive cycles of uniform frequency by unidirectional rotation of said stream and contour, thereby causing an impulse for each cycle; relatively propelling said contour and stream along said contour in response to a part of each impulse; and correcting the alignment of the direction of said relative propulsion with respect to the direction of said contour in response to the remainder of each impulse.

5. Method of line tracker control, which comprises subjecting a contour and a stream of radiant energy to alternately increasing and decreasing overlapping relation in successive cycles of uniform frequency; successively completing power circuits for relatively propelling said stream and contour in successive angular directions; and energizing said power circuits in response to impulses for each cycle proportional to the portion of energy escaping said contour to the portion affected thereby during each cycle; said power circuits relatively propelling said contour and stream along said contour in response to a part of each impulse; and said power circuits correcting the alignment of the direction of said relative propulsion with respect to the direction of said contour in response to the remainder of each impulse, by relatively moving said stream and contour toward each other during one period of each impulse, and away from each other during another period of each impulse.

6. Method of line tracker control, which comprises subjecting a contour and a stream of radiant energy to alternately increasing and decreasing overlapping relation in frequent successive cycles; relatively propelling said stream and contour in selected angularly successive directions by successive phases of a power circuit; and determining the direction of resultant movement by selecting a portion of said phase succession in response to the proportion of radiant energy escaping said contour to the portion affected thereby.

7. Method of line tracker control, which comprises relatively rotating a contour and a stream of energy into alternating increasing and decreasing overlapping relation; relatively propelling said stream and contour in angularly successive directions by successive phases of a power circuit in which the phases are in quadrature, and correcting the direction of resultant movement to be in alignment with the contour by selecting a portion of said phase relation and controlling the extent of movement in each of said angularly successive directions in response to the proportion of energy escaping said contour to the portion affected thereby.

8. Apparatus for line tracker control, which comprises means for relatively moving a contour and a stream of radiant energy along said contour; means for subjecting said stream and contour to alternately increasing and decreasing overlapping relation in successive cycles of uniform frequency during said relative movement by relative rotation of said stream and contour; and means for correcting the alignment of the direction of said relative movement with respect to the direction of said contour during each cycle.

9. Apparatus for line tracker control, which comprises means for subjecting a stream of radiant energy to alternately overlapping and clearing relation with successive small edge zones along a contour in successive cycles recurrent at short intervals by continuous relative rotation of said stream and contour, thereby causing an impulse for each cycle; means for relatively propelling said contour and stream along said contour in response to a part of each impulse; and means for controlling the direction of said relative propulsion in response to the timing of said impulse within its cycle.

10. Apparatus for line tracker control, which comprises means for subjecting a stream of radiant energy to alternately overlapping and clearing relation with successive small edge zones along a contour in successive cycles of predetermined frequency by unidirectional rotation of said stream and contour, thereby causing an impulse for each cycle; means for relatively propelling said contour and stream along said contour in response to a part of each impulse; and means for correcting the alignment of the direction of said relative propulsion with respect to the direction of said contour in response to the remainder of each impulse.

11. Apparatus for line tracker control, which comprises means for overlapping a contour and a stream of radiant energy; means for relatively propelling said stream and contour in selected angularly successive directions means for distributing successive phases of a power circuit to said propelling means; and means for determining the direction of resultant movement comprising a sensing device responsive to the ratio of radiant energy escaping said contour to the portion affected thereby, and means actuated by said sensing device for selecting a portion of said phase succession for energizing said propelling means.

12. Apparatus for line tracker control, which comprises means for relatively propelling a stream of radiant energy and a contour in angularly successive directions means for distributing successive phases of a power circuit to said propelling means; a shutter for said stream having an arcuate opening and an opening of greater radius; means for rotating said shutter; and means responsive to radiant energy escaping said shutter for selecting a portion of said phase succession for energizing said propelling means and thereby determining the angular direction of said relative propulsion.

13. Apparatus for line tracker control, which comprises means for overlapping a contour and a stream of radiant energy; means for relatively propelling said stream and contour in angularly successive directions; means for energizing said propelling means comprising thermionic tubes each having a grid and a plate; a sensing device responsive to the proportion of radiant energy escaping said contour to the portion affected thereby; means actuated by said sensing device for determining the resultant direction of said relative propulsion by imposing more positive potential upon the grids of thermionic tubes simultaneously in response to the proportion of radiant energy escaping said contour to the portion cut off thereby; means for distributing the phases of a power circuit respectively to said tubes and thereby rectifying said phases and imposing more positive potential on said plates; said contour and stream being propelled in said resultant direction by the rectified output of the tubes having grids and plates simultaneously of more positive potential.

14. In combination, a dynamo having an armature and two fields connected for opposite generative polarity, in opposite directions; a source of current conductors connected to said fields and adapted to form parts of circuits from said source; means for selectively affecting the circuits from said current source through said fields; a source of radiant energy; means exposed to radiant energy from said radiant energy source and responsive to energy receivable therefrom for controlling the passage of current from said current source to said circuit completing means; and unidirectional rotary means for intermittently interrupting passage of energy from said energy source to said controlling means in cycles of uniform frequency.

15. In apparatus for line tracker control, means for supporting a representation of a contour, a unidirectionally rotatable sensing member capable of sensing its proximity to the boundary of said representation of a contour and automatically maintaining its center of rotation at a constant distance from said boundary of the representation.

16. In apparatus for line tracker control, means for supporting a representation of a contour, a unidirectionally rotatable sensing element capable of sensing its proximity to the boundary of said contour, the rotation of the sensing element relative to the boundary of the representation creating impulses of a duration determined by the proximity of the sensing element to said boundary of the representation, said center of rotation of said sensing element being moved to closer proximity to the boundary of the representation by short impulses and away from said boundary by impulses of a longer duration.

17. In apparatus for line tracker control, means for supporting a representation of a contour; a unidirectionally rotatable sensing device capable of sensing its proximity to the boundary of said contour; the rotation of the sensing element relative to the boundary of the representation creating impulses of duration determined by the proximity of the sensing element to said boundary of the representation; said center of rotation of said sensing element being moved to closer proximity to the boundary of the representation by short impulses and away from said boundary by impulses of longer duration; said sensing element having a portion of its boundary circular and the center of rotation of said sensing element being so maintained relative to the boundary of the representation that said circular portion is tangent to said boundary of the representation at least once in each cycle of operation of the sensing element.

18. Method of line tracker control, which comprises subjecting a contour and a stream of radiant energy to alternately increasing and decreasing overlapping relation in frequent successive cycles; distributing successive phases of a power circuit to electrical valves each having an input circuit, an output circuit, and a control circuit; said input circuit for each valve being energized by a separate phase of said power circuit; energizing said control circuits in response to the proportion of radiant energy escaping said contour to the portion affected thereby; and relatively propelling said stream and contour in selected angular directions in response to energization of said output circuits; the extent of relative movement in each direction being determined by said control circuit.

19. Method of line tracker control, which comprises subjecting a contour and a stream of radiant energy to alternately increasing and decreasing overlapping relation in frequent successive cycles; distributing successive phases of a power circuit to electrical valves each having an input circuit, an output circuit, and a control circuit, in which the input circuits are successively energized so that said output circits are responsive to the energization of the control circuits; energizing said control circuits in response to the proportion of radiant energy escaping said contour to the portion affected thereby; and relatively propelling said stream and contour in selected angular directions in response to energization of said output circuits.

20. Method of line tracker control, which comprises subjecting a contour and a stream of radiant energy to alternately increasing and decreasing overlapping relation in frequent successive cycles; distributing successive phases of a power circuit to thermionic valves each having an input circuit, an output circuit, and a control circuit; said input circuit for each valve being energized by a separate phase of said power circuit; energizing said control circuits in response to the proportion of radiant energy escaping said contour to the portion affected thereby; and relatively propelling said stream and contour in resultant directions in response to energization of said output circuits; the cycles of said overlapping relation of said stream and contour being synchronized with the phases of said power circuit.

21. Method of line tracker control, which comprises subjecting a contour and a light beam to alternately increasing and decreasing overlapping relation in frequent successive cycles; distributing successive phases of a power circuit to the input circuits of thermionic valves each having an output circuit and a control circuit; photoelectrically energizing said control circuits in response to light escaping said contour during said overlapping relation, and relatively propelling said stream and contour in selected angular directions in response to energization of said output circuits.

22. Method of line tracker control, which comprises subjecting a contour and a stream of radiant energy to alternately increasing and decreasing overlapping relation in frequent successive cycles; distributing successive phases of a power circuit to thermionic tubes each having an input circuit, an output circuit including a plate, and a control circuit including a grid; imposing more positive potential upon the grids of said control circuits in response to the proportion of radiant energy escaping said contour to the portion affected thereby; and relatively propelling said stream and contour in successive angular directions in response to energization of those of said output circuits of which the plates are positive.

23. Apparatus for line tracker control, which comprises means for subjecting a contour and a stream of radiant energy to alternately increasing and decreasing overlapping relation in successive cycles of uniform frequency; means for relatively propelling said stream and contour in angularly successive directions; means for energizing said propelling means comprising thermionic tubes each having a grid; means for distributing successive phases of a power circuit to said thermionic tubes; and means for determining the direction of resultant movement comprising a sensing device responsive to the ratio of radiant energy escaping said contour to the portion affected thereby, and means actuated by said sensing device for imposing more positive potential upon the grids of said tubes simultaneously, for selecting a portion of said phase succession for energizing said propelling means.

24. The method of controlling the tracing of a contour which comprises relatively moving said contour and a tracer longitudinally of the contour in intercepting relation, and during such relative movement continuously imparting other relative movement of continuous rotation between said tracer and said contour transversely of the contour to alternately increase and decrease the interception of the contour and the tracer and to vary the amounts of such increases and decreases in accordance with changes in the direction of the contour, and varying the direction of such first-mentioned relative movement in accordance with the changes in the amounts of such increases and decreases.

25. The method of controlling the tracing of a contour which comprises relatively moving said contour and a tracer longitudinally of the contour in intercepting relation, and during such relative movement continuously imparting other relative movement between said tracer and said contour transversely of the contour along a predetermined continuous circular path to alternately increase and decrease the interception of the contour and the tracer with changes in the direction of the contour, and varying the direction of such first-mentioned relative movement in accordance with changes in such increases and decreases in interception of the tracer and the contour.

26. The method of controlling the tracing of a contour which comprises relatively moving said contour and a tracer longitudinally of the contour in intercepting relation, and during such relative movement continuously imparting other relative movement of continuous rotation between said tracer and said contour transversely of the contour to alternately increase and decrease the interception of the contour and the tracer at successive points closely spaced progressively along said contour and to vary the amounts of such increases and decreases in accordance with changes in direction of the contour, and varying the direction of such first-mentioned relative movement in accordance with changes in the amounts of such increases and decreases of such interception due to changes in the contour.

27. The method of controlling tracing of a contour which comprises relatively moving said contour and a light beam longitudinally of the contour in intercepting relation, and during such relative movement, continuously rotating said beam and contour relative to each other transversely of the contour, said longitudinal and rotating movements combining to form a cycloidal path to alternately increase and decrease the interception of the beam and said contour and to vary the amounts of such increases and decreases in accordance with change in the direction of the contour, and varying the direction of such first-mentioned relative movement in accordance with the changes in the amounts of such increases and decreases in light interception.

28. Mechanism for governing the relative movements between tracer and pattern supports to trace a pattern comprising, in combination, electric power actuated means for effecting relative movement between said supports in any direction in a plane, one of said supports providing a mounting for said pattern, means on the other of said supports adapted to rotate in a circle which is fixed relative to the latter support and to direct a beam of light toward said pattern, power actuated mechanism for relatively moving said beam and pattern along said circle to alternately intercept and clear each other, a photosensitive device fixed on said other support and responsive to the varying amounts of light escaping said pattern, and means controlled by said device and governing the electric power supplied to said electrical power actuated means and thereby governing the direction of relative advance of said supports by said power actuated means to cause relative motion between said beam and pattern longitudinally of the latter.

29. In a mechanism for controlling the tracing of a contour, the combination of, a tracer, electric power actuated means for moving said tracer and contour relative to each other along the contour, electric power actuated means operable continuously to move said tracer and said contour relative to each other transversely of the direction of such first-mentioned relative movement and alternately toward and away from the contour to increase and decrease the interception of said tracer and said contour and to vary the amounts of such increases and decreases as the contour changes, and means for varying the electrical power supplied to said first-mentioned electric power actuated means for thereby varying the direction of such first-mentioned relative movement in accordance with variations in the interception of said contour and said tracer.

30. In a mechanism for controlling the reproduction of a contour, the combination of, a tracer comprising a beam of light projected toward said contour, electrical means for relatively moving said contour and said light beam along the direction of the contour, means operable during such relative movement for continuously imparting other relative movement of rotation between said tracer and said contour overlapping the contour to alternately increase and decrease the interception of the light beam by the contour and vary the amounts of the increases and decreases as the contour changes, and mechanism including a light sensitive device responsive to the varying amounts of light interception by said contour and operable to vary the electrical power supplied to said electrical means and control the direction of such first-mentioned relative movement and thereby follow changes in the direction of said contour.

31. In a mechanism for controlling the tracing of a contour, the combination of a tracer, electrical means for moving said tracer and said contour relative to each other along the contour, means operable continuously to rotate said tracer and said contour relative to each other transversely of the direction of such first-mentioned relative movement and alternately toward and away from the contour to increase and decrease the interception of said contour and tracer and to vary the amounts of such increases and decreases as the direction of the contour changes, and means for varying the electrical power supplied to said electrical means for controlling the direction of such first-mentioned relative movement in accordance with variations in the interception of said contour and said tracer.

32. Method of line tracker control, which comprises overlapping a contour with a stream of radiant energy in successive cycles; causing impulses for each cycle proportional to the ratio of radiant energy escaping said contour to the radiant energy affected thereby; distributing said impulses to successive phases of a power circuit; and relatively propelling said stream and contour by said successive phases in angularly successive directions for distances proportional to said impulses.

33. Apparatus for line tracker control, which comprises means for overlapping a contour with a stream of radiant energy in successive cycles; means for causing impulses for each cycle proportional to the ratio of radiant energy escaping said contour to the radiant energy affected thereby; means for distributing said impulses to successive phases of a power circuit; and means for relatively propelling said stream and contour by said successive phases in angularly successive directions for distances proportional to said impulses.

34. Method of line tracker control, which comprises eccentrically rotating a stream of energy continuously in the same direction of rotation at uniform speed through successive segments about an axis, subjecting said rotating stream and a contour to alternately overlapping and clearing relation during each rotation, relatively moving said axis and contour in response to overlapping relation during at least a part of the initial segment in a resultant direction having a component increasing the overlap and a component in a forward direction along said contour, thereafter relatively moving said axis and contour in response to overlapping relation during at least a part of a subsequent segment in said forward direction along said contour, thereafter relatively moving said axis and contour away from each other in response to overlap during at least a part of a further segment until said stream and contour clear each other, and repeating the cycle after rotation of said stream again brings it into overlapping relation with said contour.

35. Method of line tracker control, which comprises eccentrically rotating a stream of energy continuously in the same direction of rotation at uniform speed through successive quadrants about an axis, subjecting said rotating stream and a contour to alternately overlapping and clearing relation during each rotation, relatively moving said axis and contour in response to overlapping relation during at least a part of the initial quadrant in a resultant direction having a component increasing the overlap and a component in a forward direction along said contour, thereafter relatively moving said axis and said contour in response to overlapping relation during at least a part of the second quadrant in said forward direction along said contour, thereafter relatively moving said axis and contour away from each other in response to overlap during at least a part of the third quadrant, thereby clearing said stream and said contour from each other during at least a part of the final quadrant.

JOHN M. FOWLE.
HARRY E. KENNEDY.